US009066498B2

(12) United States Patent  
Kosanke (10) Patent No.: US 9,066,498 B2  
(45) Date of Patent: *Jun. 30, 2015

(54) BIRD SUPPORT AND PROTECTION DEVICE AND METHOD OF SUPPORTING AND PROTECTING A BIRD

(71) Applicant: Crazy K Farm Pet and Poultry Products, LLC, Hempstead, TX (US)

(72) Inventor: Tobi Kosanke, Hempstead, TX (US)

(73) Assignee: Tobi Kosanke, Hempstead, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,047

(22) Filed: Dec. 12, 2013

(65) Prior Publication Data

US 2014/0096723 A1  Apr. 10, 2014

Related U.S. Application Data

(63) Continuation-in-part of application No. 13/302,234, filed on Nov. 22, 2011, now Pat. No. 8,635,975.

(51) Int. Cl.
*A01K 13/00* (2006.01)
*A01K 45/00* (2006.01)

(52) U.S. Cl.
CPC ............... *A01K 13/006* (2013.01); *A01K 45/00* (2013.01)

(58) Field of Classification Search
USPC ......... 119/853, 850, 863, 865, 856, 857, 858, 119/174, 792, 907, 713, 714, 793; 54/79.2, 54/79.1, 79.3, 79.4; D30/144, 145, 152
See application file for complete search history.

(56) References Cited

U.S. PATENT DOCUMENTS

| | | |
|---|---|---|
| 1,008,050 A | 11/1911 | Osborn |
| 1,066,821 A | 7/1913 | Kurrelmeyer |
| 2,882,858 A | 4/1959 | Dlugi |
| 3,101,696 A | 8/1963 | Lipman |
| 5,109,801 A | 5/1992 | Gahagan |
| 5,218,928 A | 6/1993 | Muck |
| 5,402,753 A | 4/1995 | Barnes |
| 6,651,595 B1 | 11/2003 | Nelson |
| D621,561 S | 8/2010 | Siklosi |
| D653,817 S | 2/2012 | Klobucnik |
| 2010/0043726 A1 | 2/2010 | Kosanke |

*Primary Examiner* — Trinh Nguyen (57) ABSTRACT

A bird support and protection device includes a body portion shaped to cover a crop of bird, being of a long-stretch material having a long-stretch direction, and having a top edge and an opposing bottom edge separated by first and second opposing side edges, a first securing strap attached to the first side edge parallel to the long-stretch direction, a second securing strap attached to the second side edge parallel to the long-stretch direction, the first and second securing straps being operable to be releasably secured at a back of the bird to attach the device to the bird such that the body portion substantially covers and supports the crop and to provide a non-constricting and adjustably secure fit.

16 Claims, 5 Drawing Sheets

BIRD SUPPORT AND PROTECTION DEVICE AND METHOD OF SUPPORTING AND PROTECTING A BIRD

CROSS-REFERENCE TO RELATED APPLICATIONS

This application is a continuation-in-part of U.S. patent application Ser. No. 13/302,234, filed Nov. 22, 2011 (which application claims the priority, under 35 U.S.C. §119, of U.S. Provisional Patent Application Ser. No. 61/415,452, filed Nov. 22, 2010), the entire disclosures of which are hereby incorporated herein by reference in their entirety.

STATEMENT REGARDING FEDERALLY SPONSORED RESEARCH OR DEVELOPMENT

Not Applicable

FIELD OF THE INVENTION

The present invention relates generally to the protection of a bird, and, more particularly, relates to a device worn by poultry for the support and protection of the poultry's crop and methods for supporting and protecting the poultry. In particular, the device utilizes one-way stretch feature of elastic

BACKGROUND OF THE INVENTION

As used herein, poultry includes chickens, ducks, geese, guinea fowl, turkeys, parrots, and other birds. Several illnesses cause the crop of poultry, in particular, chickens, ducks, geese, guinea fowl, turkeys, and parrots, to become weakened, distended, slow or sour. When one of these symptoms occurs, it is necessary to support the bird's crop. Without crop support, the bird is unable to process food properly and can perish. Sometimes, the crop muscle stretches to a point that it is unable to retract. Therefore, a possibility exists that support of the crop is not only required until the bird heals, it also could be necessary to support the bird's crop for the life of that bird.

A common location of pecking of hens by other hens is on their chests. Once blood is drawn, the pecking can escalate, resulting in infection and even death. For example, parrots often self-mutilate, plucking out all feathers from their chest area until the feathers can no longer regrow.

Prior art poultry protection devices do not protect the chest area of the bird or provide support for a weakened crop. See, e.g., U.S. Patent Publication No. 2010/0043726A1 and U.S. Pat. Nos. 6,651,595, 5,218,928, and 3,101,696. In particular, they do not cover the upper portion of the chest, which is the area most likely to be pecked and/or over-plucked. Prior art devices are not flexible nor do they provide a custom, comfortable, and adjustable fit when secured to the bird, regardless of the width and weight of the bird.

An elastic bandage, sometimes referred to as a compression bandage, is stretchable and when properly used provides localized pressure and support. Elastic bandages are most commonly used after a part of the body, such as a leg, ankle, arm or wrist, is injured. For example, elastic bandages are used to provide support to an area of the body to prevent further injury, reduce or prevent swelling, maintain injured bones or a device (e.g., a splint) in proper position and other reasons. Currently existing elastic bandages are made of latex as well as non-latex woven or knitted materials. More recently manufactured elastic bandages are made of cotton, polyester and latex-free elastic yarns. Such bandages use metal clips or hook and loop fasteners (i.e., Velcro®) as measures to keep the bandages from unraveling. In addition to being worn on the arms, wrists, legs, and ankles, elastic bandages also have been worn on other parts of the body, such as around the torso as a sort of body wrap for weight loss, back support and other reasons.

Conventional elasticated woven or knitted bandages have one or more warp yarns that comprise elastomeric materials such as natural rubber or synthetic elastomeric materials such as polyurethane. By varying the ratio of cotton, polyester, and the elastic yarns within a bandage, manufacturers are able to offer various grades of compression and durability in their wraps.

Aside from use in sports medicine and by orthopedists, elastic bandages are popular in the treatment of lymphedema and other venous conditions, for weight loss when applied as a body wrap, and rehabilitating injured animals through veterinary medicine. These bandages are often used as a method to compress breasts of women or for men with abnormally large or shaped chests to help create a more masculine body shape.

Thus, a need exists to overcome the problems with the prior art devices as discussed above.

SUMMARY OF THE INVENTION

The invention provides a bird crop support and protection device and method of protecting a bird's crop that overcome the hereinafore-mentioned disadvantages of the heretofore-known devices and methods of this general type and that provides protection of the crop with an material that allows a pendulating crop to be supported while the bird is rehabilitating.

To support the crop, the invention takes advantage of the features of what are referred to herein as long-stretch materials, one of such materials being an elastic bandage. This feature of conventional elastic bandages is that the material stretches significantly in the longitudinal direction but stretches relatively little or virtually not at all in the cross direction. This property occurs for woven elastic bandages because the warp threads of the bandage are elastic threads or include elastic threads and, in general, the weft threads woven therewith do not. While there can be some stretch in the weft direction due to the natural properties of the threads of the weft, the stretching of the elastic bandage in the warp direction is significantly greater, of about 2:1 or more. With these differences of stretching in mind, the term "long-stretch material" is defined herein to describe woven materials (such as those used for elastic bandages) as well as any other fabric or man-made structure that experiences a significant stretching in a first direction and an insignificant stretching in another second direction different from the first direction and that crosses or is transverse to the first direction. Therefore, it is possible for a fabric to not be woven but, instead, to be knitted and have wales and courses, for example, and still be a long-stretch material if that material experiences significant stretchability in the first direction and significantly less or virtually no stretchability in a transverse second direction.

With the foregoing and other objects in view, there is provided, in accordance with the invention, a bird support and protection device includes a body portion shaped to cover a crop of bird, being of a long-stretch material having a long-stretch direction, and having a top edge and an opposing bottom edge separated by first and second opposing side edges, a first securing strap attached to the first side edge parallel to the long-stretch direction, a second securing strap attached to the second side edge parallel to the long-stretch direction, the first and second securing straps being operable to be releasably secured at a back of the bird to attach the device to the bird such that the body portion substantially covers and supports the crop and to provide a non-constricting and adjustably secure fit.

With the objects of the invention in view, there is also provided a method of supporting and protecting a bird's crop, the method including attaching the bird support and protection device to the bird, by positioning the body portion over at least a portion of the bird's crop to orient the long-stretch in a head-to-toe orientation and securing the first and second securing straps at the back of the bird.

With the objects of the invention in view, there is also provided a method of supporting and protecting a bird's crop including attaching the bird support and protection device to the bird, by positioning the body portion over at least a portion of the bird's crop to orient the long-stretch in a transverse orientation and securing the first and second securing straps at the back of the bird.

In accordance with another feature of the invention, the body portion includes a main body and at least one of an outer panel and an inner liner attached thereto.

In accordance with a further feature of the invention, the first and second securing straps are operable to be secured at the back of the bird to define a single point of attachment including one of a bow and a knot.

In accordance with an added feature of the invention, the first and second securing straps are operable to be secured at the back of the bird in two points of attachment including one of two separate bows, two separate knots, and a bow and a knot.

In accordance with an additional feature of the invention, each of the first and second securing straps includes a two-part couple assembly including a first part on a first portion of each securing strap and a second part on a second portion of each securing strap, the first and second parts being operable to couple the second portion of each strap to the first portion of the opposing strap to secure the first and second securing straps at the back of the bird in two points of attachment.

In accordance with yet another feature of the invention, the first part of each securing strap includes a body member defining an aperture operable to receive therethrough the second part of the opposing strap, each second part includes a first sub-part and a second sub-part, and each first sub-part is operable to attach to the respective second sub-part of the same strap after being received through the aperture of the first part of the opposing strap to releasably couple the second portion of each strap to the first portion of the opposing strap.

In accordance with yet a further feature of the invention, the second part includes one of a hook and loop fastener, a snap fastener, and a button and hole fastener.

In accordance with yet an added feature of the invention, the securing straps and/or the body portion are comprised of at least one of elastic, lycra, cotton, denim, canvas duck, leather, nylon, fleece, Kevlar, and rubber.

In accordance with yet an additional feature of the invention, the body portion includes a main body, an outer panel, and an inner liner and each of the securing straps, the main body, and the outer panel are comprised of elastic and the inner liner is comprised of one of fleece and cotton.

In accordance with again another feature of the invention, the first and second securing straps are attached to the body portion by at least one of sewing, an adhesive, a snap fastener, and a hook and loop fastener.

In accordance with again a further feature of the invention, the main body is attached to the at least one of the outer panel and the inner liner by at least one of sewing, an adhesive, a snap fastener, and a hook and loop fastener.

In accordance with again an added mode of the invention, each of the first and second securing straps extend longitudinally along an entirety of the body portion length and have a strap length greater than the body portion length such that each securing strap extends beyond at least one of the top and bottom edges. In particular, the securing straps have a length that is sufficient to encircle the bird and fasten at the back of the bird, for example, in a bow knot.

In accordance with again an additional mode of the invention, the body portion is shaped as a bra to cover and support the crop of the bird by applying pressure against the crop with the stretch of the long-stretch material when worn by the bird.

In accordance with still another mode of the invention, the first securing strap is integral with the first side edge and the second securing strap is integral with the second side edge.

In accordance with a concomitant mode of the invention, the body portion is shaped to apply pressure to lift the crop.

With a crop bras described herein, support of the crop can occur for the life of the bird where the crop muscle stretches to a point that it is unable to retract. The crop bras do not interfere with the normal activity of the bird and provide sufficient support of the crop to keep movement of the food through the crop and prevent the food from detrimentally remaining there.

Although the invention is illustrated and described herein as embodied in a poultry support and protection device and methods of supporting and protecting poultry, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 1:
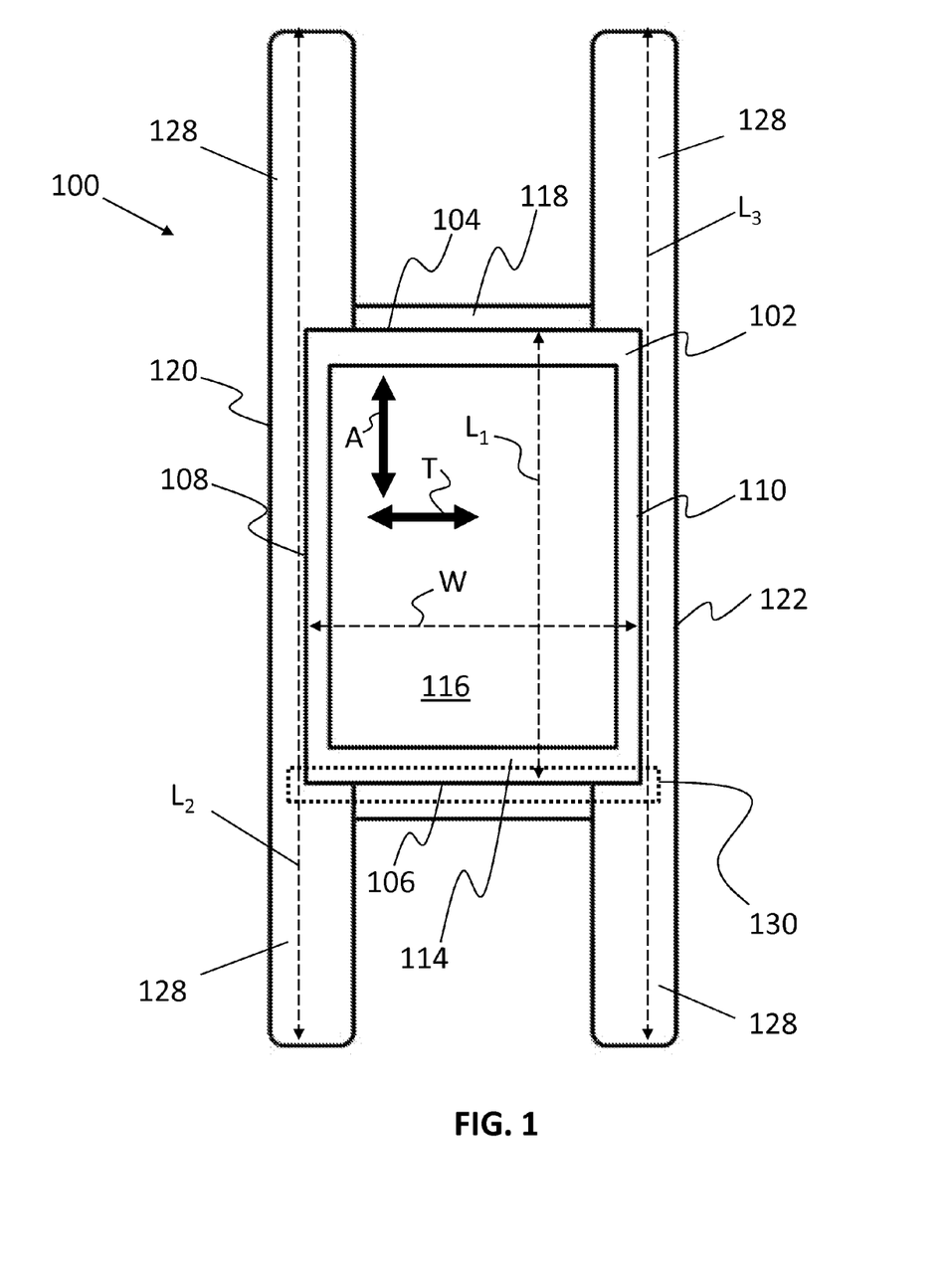
FIG. 1 is a plan view of a poultry crop support and protection device in accordance with an exemplary embodiment of the present invention in an open, laid-flat configuration.

Described now are exemplary embodiments of the present invention. Referring now to the figures of the drawings in detail and first, particularly to FIG. 1, there is shown a first exemplary embodiment of a poultry support and protection device 100 for protecting and supporting a bird's crop, for example, when the bird suffers from crop stasis, slow crop, sour crop, or has a distended or pendulous crop. As will be described below, the poultry support and protection device 100 can be provided in several shapes and sizes and includes various combinations of features and components and varying numbers and functions of the components. As shown in FIG. 1, an exemplary poultry support and protection device 100 is in a flattened state and is ready to be attached to a bird. The exemplary poultry support and protection device 100 includes a body portion 102 shaped to cover the crop of the bird. The body portion 102 includes a top edge 104, an opposing bottom edge 106, and opposing side edges 108, 110.

As depicted in FIG. 1, the top and bottom edges 104, 106 define the width W of the body portion 102 and the side edges 108, 110 define the length $L_1$ of the body portion 102. Attached to the side edges 108, 110 are respective securing straps 120, 122, each of which extends longitudinally along the entire length $L_1$ of the body portion 102. This provides added support to the body portion 102. Each of the straps 120, 122 has a respective length $L_2$, $L_3$, which lengths may or not be equivalent to one another but which are both greater than the length $L_1$ of the body portion 102. Thus, in the laid-flat, non-use configuration of FIG. 1 shown, each strap 120, 122 includes a free end 128 (i.e., an end unconnected to any other part of the device 100) that extends beyond at least one of the top and bottom edges 104, 106 of the body portion 102. Each strap free end 128 is operable to attach releasably to another one of the strap free ends 128 at the back of the bird to secure the body portion 102 over the crop of the bird in a non-constricting, adjustable, and secure fit. The back of the bird as used herein includes any back region of the bird opposing a front or crop region of the bird. The various methods for attaching the exemplary support and protection device 100 are described below in further detail.

In the exemplary embodiment of FIG. 1, the body portion 102 includes three layers of material: a main body 114; an outer panel 116; and an inner liner 118 (mostly hidden in FIG. 1). The main body 114 is a fabric of material including but not limited to elastic, lycra, cotton, denim, canvas duck, leather, nylon, and/or combinations thereof. The outer panel 116 is a fabric of material including but not limited to elastic, lycra, cotton, denim, canvas duck, leather, nylon, Kevlar®, rubber, and/or combinations thereof. The inner liner 118 is a fabric of material including but not limited to elastic, lycra, cotton, fleece, denim, canvas duck, leather, nylon, and/or combinations thereof. In an exemplary embodiment, the main body 114 and outer panel 116 are made of elastic and the inner liner 118, being the layer of material closest to the bird, is made of cotton or fleece to provide added comfort to the bird. The securing straps 120, 122 are made of any of the above materials mentioned with respect to the main body 114 and are attached to the body portion 102 by any suitable means known or contemplated in the art, e.g., through sewing, adhesives, such as glue or tape, and/or mechanical fasteners, such as snap fasteners or hook and loop fasteners. The three layers 114, 116, 118 of material are similarly attached together by any suitable means known or contemplated in art and listed above with respect to the attachment of the straps 120, 122 to the body portion 102.

Although each layer of material is shown in FIG. 1 as having a rectangular shape, other shapes, e.g., circular or ovular, are also within the scope of the present invention as long as the shape of the body portion 102 is configured to cover and protect the bird's crop. It is also within the scope of the present invention for the body portion 102 to include only a single layer of material (the main body 114), two layers of material (the main body 114 and either an outer panel 116 or an inner liner 118), or more than three layers of material.

In another exemplary embodiment of the invention, the body portion 102 is or includes a long-stretch material. For example, any one or more of the three layers of material (the main body 114, the outer panel 116, and the inner liner 118) is a long-stretch material or all are long-stretch materials.

In an exemplary configuration, the stretching direction of the long-stretch material is parallel to the straps 120, 122, as indicated by arrow A. With the long-stretch in the upright or head-to-toe orientation, the crop of the bird is allowed to move in the upright direction but is limited in moving in the transverse or left-to-right direction. Such a configuration does not inhibit proper functioning of the crop but still provides support and protection.

If desired, a cross-strap 130 (shown in dotted lines) can be secured to the bottom edge 106 and to the straps 120,122. The cross-strap 130 would act as in the manner of an underwire of a bra and provide a bottom securing area that prevents the crop from sagging or pendulating below the cross-strap 130, thereby supporting a pendulated crop and preventing the condition where food is not able to exit the crop into the stomach.

In another exemplary configuration, the stretching direction of the long-stretch material is perpendicular to the straps 120, 122, as indicated by arrow T. With the long-stretch in the transverse or left-to-right orientation, the crop of the bird is allowed to move in the transverse direction but is limited in moving in the upright or head-to-toe direction. Such a configuration does not inhibit proper functioning of the crop but still provides support and protection. If desired, the cross-strap 130 can be secured to the bottom edge 106 and to the straps 120,122 as in the previous embodiment.

Figure 2:
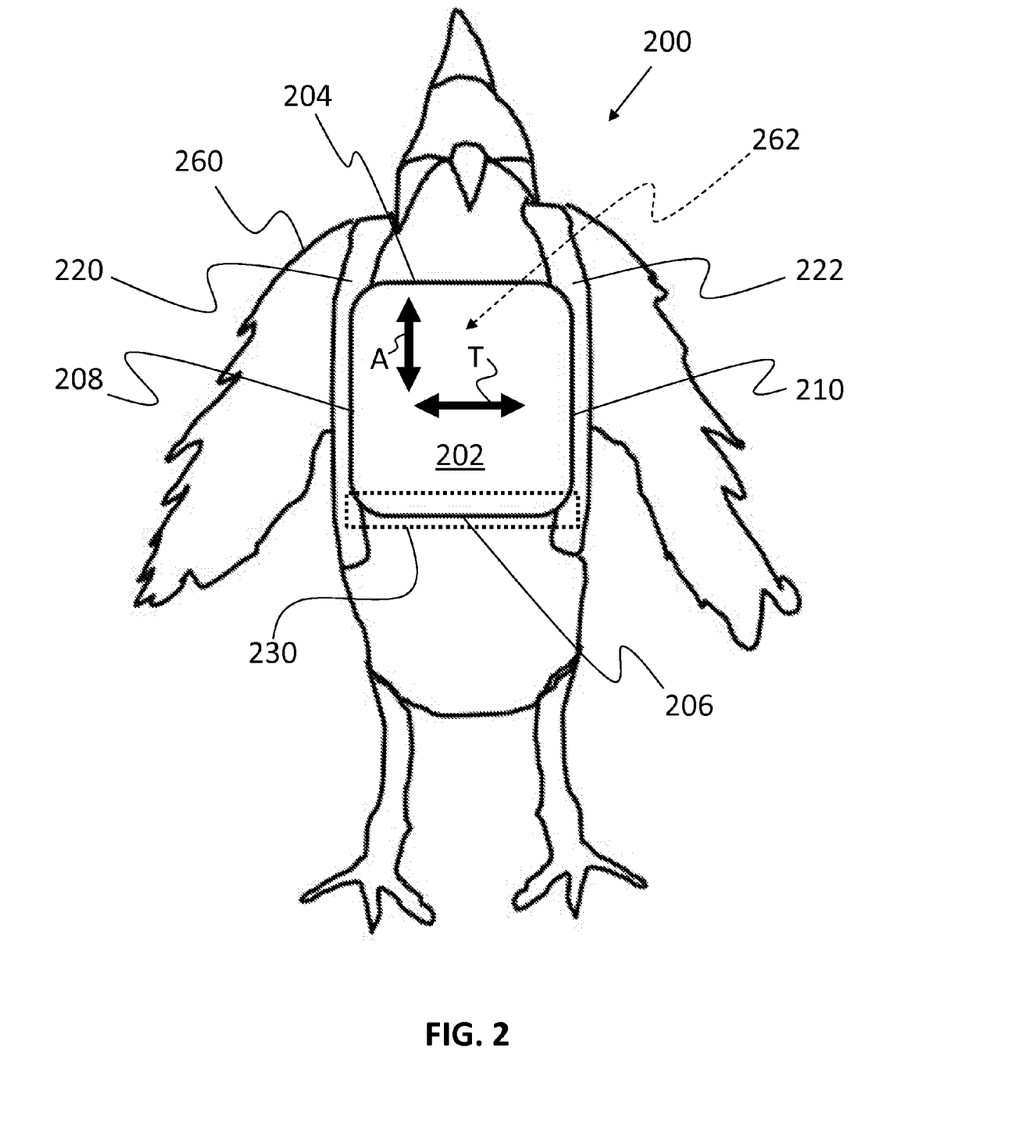
FIG. 2 is a bottom perspective view of a chicken with a poultry crop support and protection device in accordance with another exemplary embodiment of the present invention attached thereto.
Figure 3:
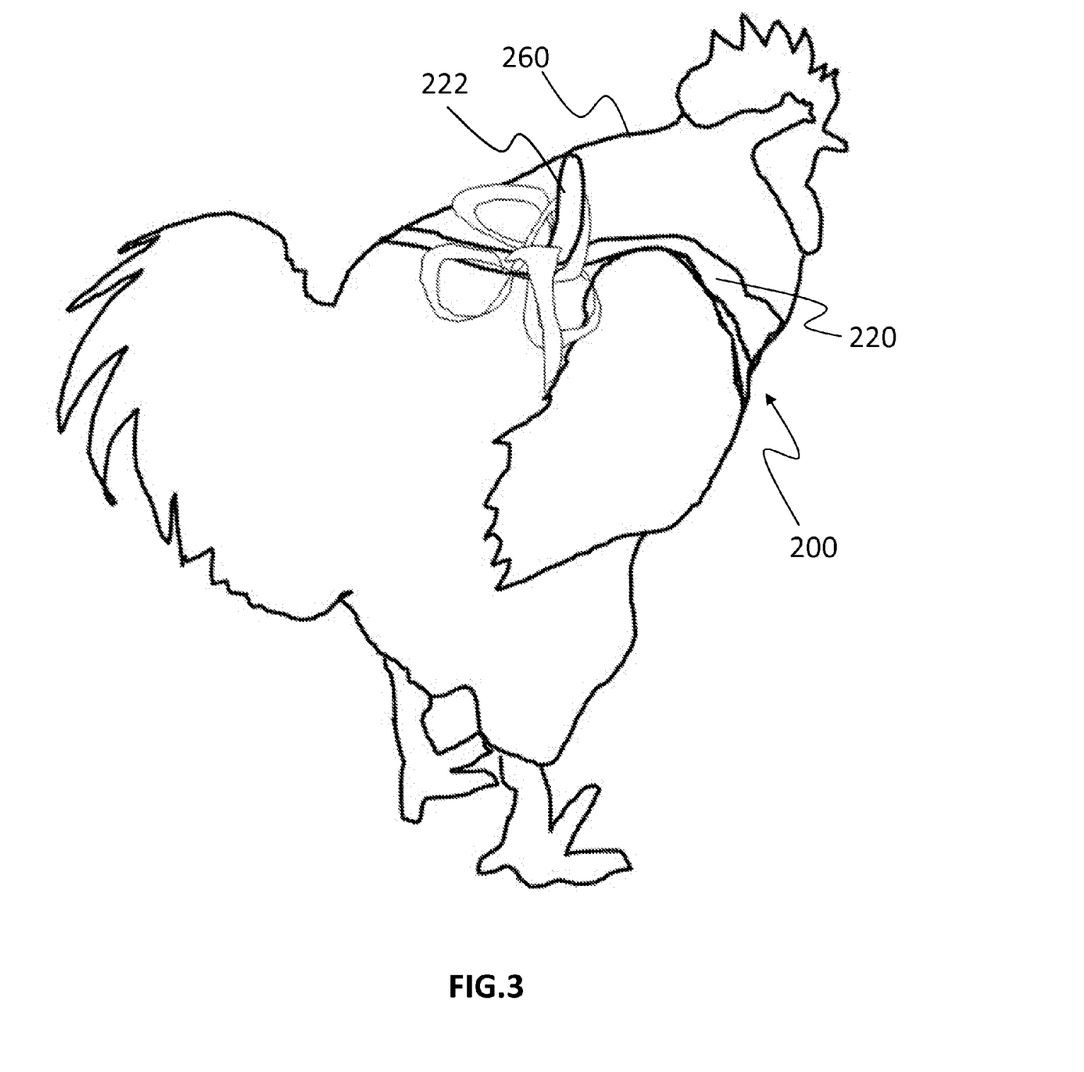
FIG. 3 is a rear-side perspective view of the chicken and poultry crop support and protection device of FIG. 2.

Referring to FIGS. 2 and 3, another exemplary embodiment of a protection and support device 200 is shown attached to a bird 260. The protection and support device 200 is similar to the device 100 of FIG. 1, wherein similar reference numbers increased by 100 refer to similar parts. As shown in FIG. 2, the body portion 202 of this exemplary embodiment includes only one layer of material, which is placed over the crop 262 of the bird 260 for support and protection thereof.

In another exemplary embodiment of the invention, the body portion 202 is or includes the long-stretch material.

In a first exemplary configuration, the stretching direction of the long-stretch material is parallel to the straps 220, 222, as indicated by arrow A. With the long-stretch in the upright or head-to-toe orientation, the crop of the bird is allowed to move in the upright direction but is limited in moving in the transverse or left-to-right direction. Such a configuration does not inhibit proper functioning of the crop but still provides support and protection.

If desired, a cross-strap 230 (shown in dotted lines) can be secured to the bottom edge 206 and to the straps 220,222. The cross-strap 230 would act as in the manner of an underwire of a bra and provide a bottom securing area that prevents the crop from sagging or pendulating below the cross-strap 230, thereby supporting a pendulated crop and preventing the condition where food is not able to exit the crop into the stomach.

In a second exemplary configuration, the stretching direction of the long-stretch material is perpendicular to the straps 220, 222, as indicated by arrow T. With the long-stretch in the transverse or left-to-right orientation, the crop of the bird is allowed to move in the transverse direction but is limited in moving in the upright or head-to-toe direction. Such a configuration does not inhibit proper functioning of the crop but still provides support and protection. If desired, the cross-strap 230 can be secured to the bottom edge 206 and to the straps 220,222 as in the previous embodiments and provide the same lifting of a pendulating crop.

As illustrated as an example in FIG. 3, the securing straps 220, 222 are tied in a bow at the back of the bird 260. The straps 220, 222 may be tied into a bow or a knot using any method of tying bows and/or knots known in the art. For example, the upper portion of one strap 220 can be tied to the lower portion of the opposite strap 222 and the upper portion of the opposite strap 222 can be interlaced through the first tie (made between the upper portion of the strap 220 and the lower portion of the strap 222) and tied to the lower portion of the strap 220 to define a single point of attachment at the back of the bird. Not only does this method of attachment provide for a non-constricting and adjustable fit (as the ties can be loosened or tightened according to the shape and size of the bird), but the single attachment point advantageously and more comfortably imparts only a single pressure point at the back of the bird.

In another exemplary method of securing the straps 220, 222 at the back of the bird, the upper portions of each of the straps 220, 222 are pulled around and behind the bird's neck and tied together in a bow or knot, and the lower portions of each of the straps 220, 222 are pulled around the bird's body, behind its wings, and tied together in a separate bow or knot. Thus, in this exemplary method of attachment, the securing straps are secured at the back of the bird defining two points of attachment (or two points of pressure on the bird's back).

Figure 4:
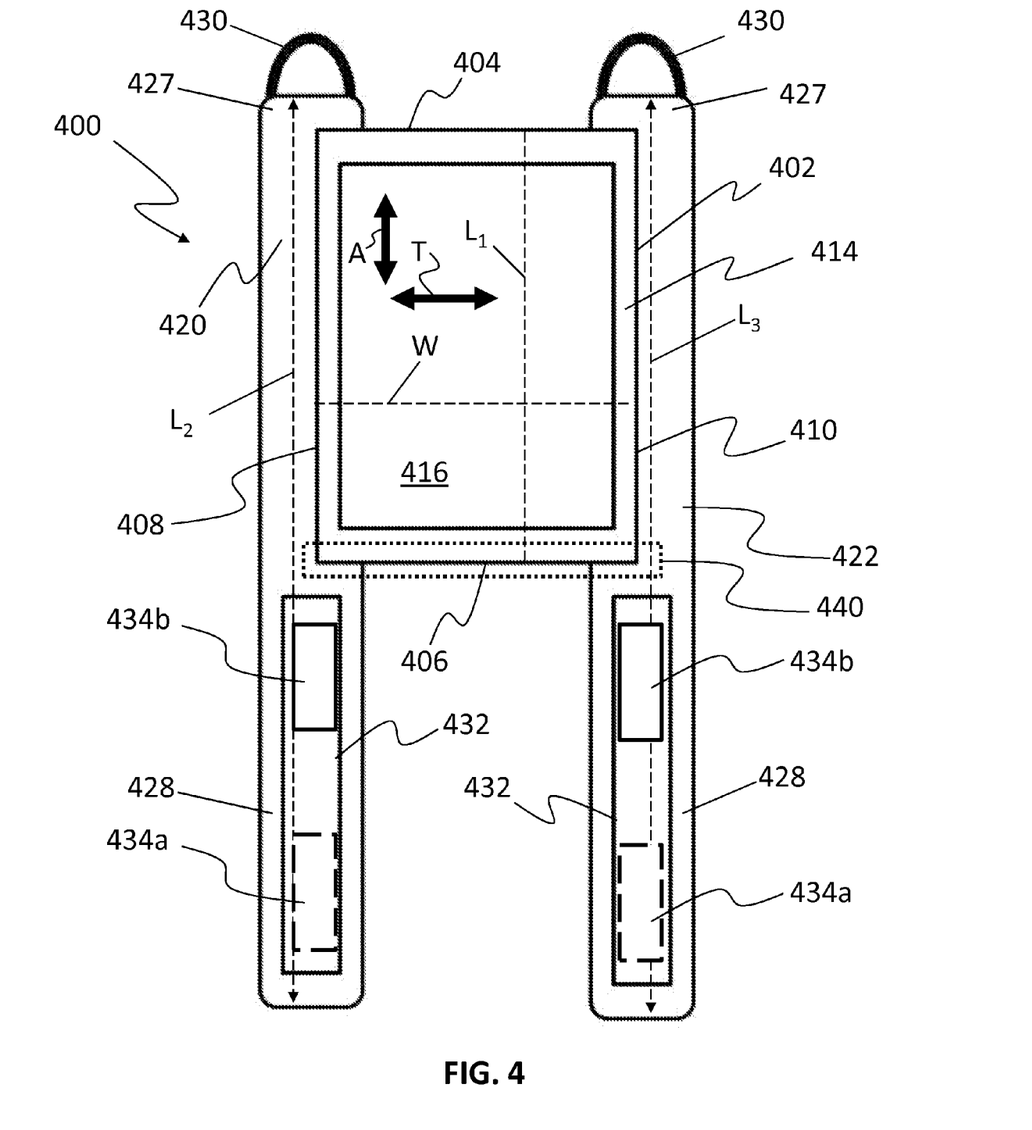
FIG. 4 is a plan view of a poultry crop support and protection device in accordance with yet another exemplary embodiment of the present invention in an open, laid-flat configuration.

FIG. 4 illustrates another exemplary embodiment of a protection and support device 400 shown in a flattened, non-use configuration. The protection and support device 400 is similar to the device 100 of FIG. 1, wherein similar reference numbers increased by 300 refer to similar parts. Each of the securing straps 420, 422 of the protection and support device 400 includes a two-part couple assembly operable to adjustably couple the securing straps 420, 422 at the back of the bird to releasably attach the device 400 to the bird such that the body portion 402 is positioned to protectively cover the bird's crop. Each two-part couple assembly includes a first couple part 430 at the upper portion 427 of each strap 420, 422 and a second couple part 432 disposed at the lower portion 428 of each strap 420, 422 (upper and lower being with regard to the orientation of FIG. 4). The first and second couple parts 430, 432 are operable to couple the lower portion 428 of each strap 420, 422 to the upper portion 427 of the opposing strap 420, 422. As shown in FIG. 4, each first couple part 430 includes a body member defining an aperture (e.g., a d-ring) operable to receive therethrough the second couple part 432 of the opposite strap.

Each second couple part 432 includes first and second sub-parts 434a, 434b operable to attach to one another. In an exemplary embodiment, the first sub-part 434a is a first fastener member (e.g., a hook of a hook and loop fastener, a first half of a snap fastener, or a hole of a button and hole fastener) disposed on the strap inner surface (as denoted by the dashed outline in FIG. 4) and the second sub-part 434b is a second fastener member (e.g., a loop of a hook and loop fastener, a second half of a snap fastener, or a button of a button and hole fastener) disposed on the strap outer surface (shown in the front plan view of FIG. 4).

To attach the exemplary protection and support device 400 to a bird, the body portion 402 is positioned over the crop and each lower strap portion 428 is pulled around the bird's body, underneath its wings in a first direction toward the upper strap portion 427 of the opposite strap 420, 422 (i.e., in a cross-wise or diagonal direction, toward the front of the bird). The first sub-part 434a of each second couple part 432 is passed through the aperture in the first couple part 430 of the opposing strap 420, 422 and pulled backward in a second direction opposite from the first direction (i.e., in a cross-wise or diagonal direction, away from the front of the bird) to attach the first sub-part 434a to the second sub-part 434b of the same second couple part 432. Thus, in this exemplary embodiment, the securing straps 420, 422 cross at the back of the bird, the lower portion 428 of each strap 420, 422 attaching to the upper portion 427 of the opposing strap, thereby defining two points of attachment (or two points of pressure on the bird's back).

In an exemplary embodiment in which the second couple part 432 is a hook and loop fastener, the second sub-part 434b is sufficient in length so as to provide an adjustably secure fit. That is, if the second sub-part 434b has a greater length along which the first sub-part 434a can attach, the strap 420, 422 can be pulled tighter or left looser and the first sub-part 434a is still capable of attaching to the second sub-part 434b. Similarly, in exemplary embodiments where the second couple part 432 is either a snap fastener or a button and hole fastener, the second sub-part 434b may include a plurality of sub-parts 434b (e.g., a plurality of snap fastener halves or a plurality of buttons or holes) disposed along the lower strap portions 428 to provide for an adjustably secure fit.

In the exemplary embodiment of FIG. 4, the body portion 402 is shown with two layers of material: a main body 414 and an outer panel 416. This is merely an example configuration and can include an inner liner 118 or other layers, or just be a single layer of material. The main body 414 is a fabric of material including but not limited to elastic, lycra, cotton, denim, canvas duck, leather, nylon, and/or combinations thereof. The outer panel 416 is a fabric of material including but not limited to elastic, lycra, cotton, denim, canvas duck, leather, nylon, Kevlar®, rubber, and/or combinations thereof. In an exemplary embodiment, the main body 414 and outer panel 416 are made of elastic. The securing straps 420, 422 are made of any of the above materials mentioned with respect to the main body 114 and are attached to the body portion 402 by any suitable means known or contemplated in the art, e.g., through sewing, adhesives, such as glue or tape, and/or mechanical fasteners, such as snap fasteners or hook and loop fasteners. The layers 414, 416 of material are similarly attached together by any suitable means known or contemplated in art and listed above with respect to the attachment of the straps 420, 422 to the body portion 402.

Although each layer of material is shown in FIG. 4 as having a rectangular shape, other shapes, e.g., circular or ovular, are also within the scope of the present invention as long as the shape of the body portion 402 is configured to cover and protect the bird's crop.

In another exemplary embodiment of the invention, the body portion 402 is or includes a long-stretch material. Any one or more of the layers of material can be a long-stretch material or all of the layers can be long-stretch materials.

In an exemplary configuration, the stretching direction of the long-stretch material is parallel to the straps 420, 422, as indicated by arrow A. With the long-stretch in the upright or head-to-toe orientation, the crop of the bird is allowed to move in the upright direction but is limited in moving in the transverse or left-to-right direction. Such a configuration does not inhibit proper functioning of the crop but still provides support and protection.

If desired, a cross-strap 440 (shown in dotted lines) can be secured to the bottom edge 406 and to the straps 420, 422. The cross-strap 430 would act as in the manner of an underwire of a bra and provide a bottom securing area that prevents the crop from sagging or pendulating below the cross-strap 430, thereby supporting a pendulated crop and preventing the condition where food is not able to exit the crop into the stomach.

In another exemplary configuration, the stretching direction of the long-stretch material is perpendicular to the straps 420, 422, as indicated by arrow T. With the long-stretch in the transverse or left-to-right orientation, the crop of the bird is allowed to move in the transverse direction but is limited in moving in the upright or head-to-toe direction. Such a configuration does not inhibit proper functioning of the crop but still provides support and protection. If desired, the cross-strap 430 can be secured to the bottom edge 406 and to the straps 420, 422 as in the previous embodiments.

Figure 5:
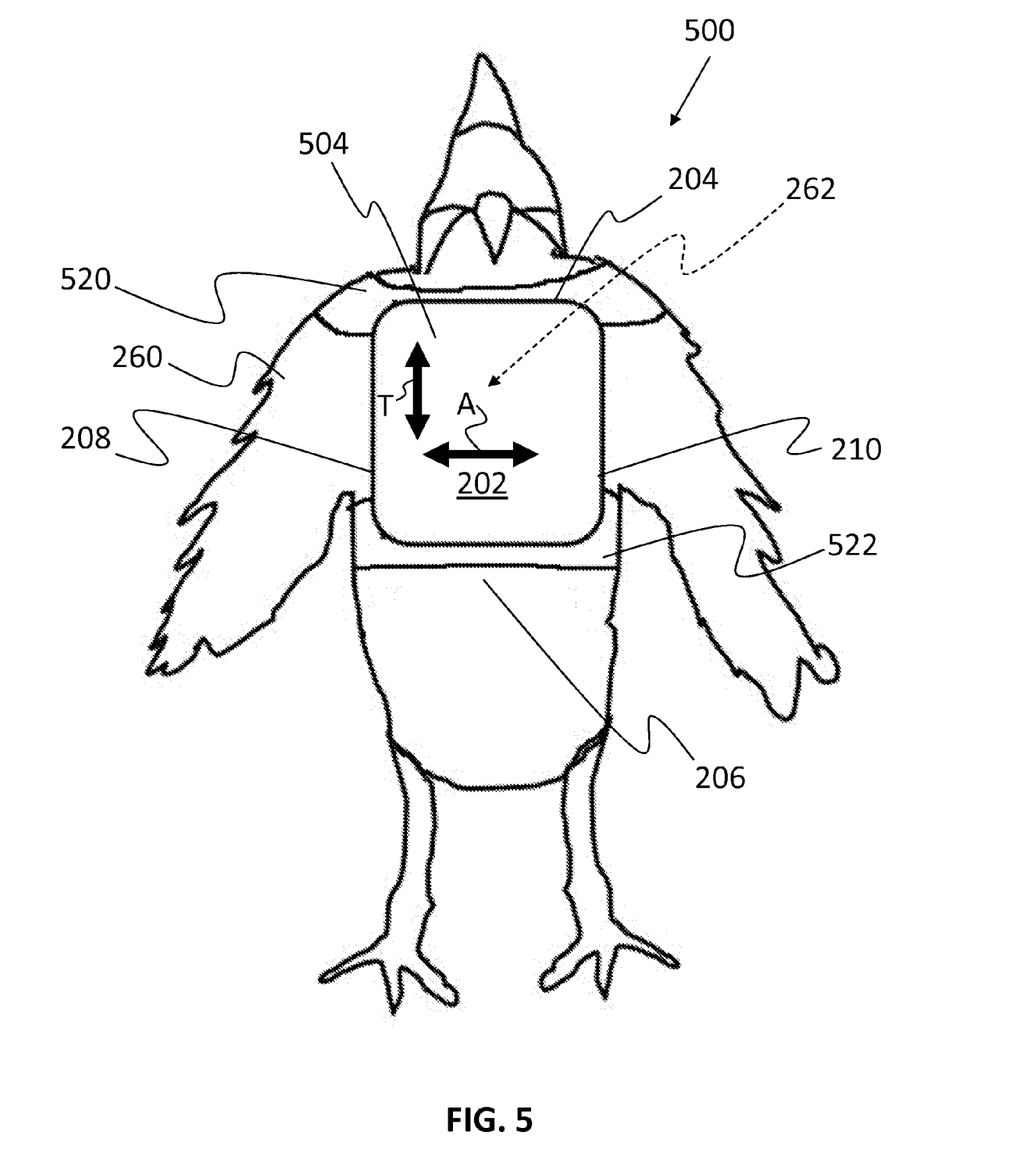
FIG. 5 is a bottom perspective view of a chicken with the poultry crop support and protection device of FIG. 2 in a further exemplary embodiment of the present invention.

Another exemplary embodiment of a poultry support and protection device 500 for protecting and supporting a bird's crop is shown in FIG. 5 attached to the bird 260. The protection and support device 500 is the same device 200 of FIG. 2 but is rotated on the bird 260 by ninety degrees. Accordingly, similar reference numbers are not increased by a number in this exemplary embodiment and those that are increased by 400 are explained how the parts of the device 200 of FIG. 2 are used differently. Similar parts, therefore, are not described herein again but are incorporated herein by reference from the various embodiments described hereinabove.

As shown in FIG. 5, the body portion 202 of this exemplary embodiment includes only one layer of material, which is placed over the crop 262 of the bird 260 for support and protection thereof. The body portion 202 includes a top edge 204, an opposing bottom edge 206, and opposing side edges 208, 210. Attached to the side edges 208, 210 are respective securing straps 520, 522, each of which extends longitudinally along the entire length of the body portion 202. Each strap 520, 522 includes a free end (not illustrated) that extends beyond at least one of the top and bottom edges 204, 206 of the body portion 202. Each strap free end is operable to attach releasably to another one of the strap free ends at the back of the bird to secure the body portion 202 over the crop of the bird in a non-constricting, adjustable, and secure fit.

The body portion 202 of the device 500 is a long-stretch material. The securing straps 520, 522 are made of any of the above materials mentioned and are attached to the body portion 202 by any suitable means known or contemplated in the art, e.g., through sewing, adhesives, such as glue or tape, and/or mechanical fasteners, such as snap fasteners or hook and loop fasteners.

The configuration of FIG. 2 is different from the configuration of FIG. 5 because the straps 520, 522 are attached in the transverse direction on the bird 260 instead of the straps 220, 222 being attached in the upright direction as shown in FIG. 2. Thus, in a configuration where the stretching direction of the long-stretch material is parallel to the straps 520, 522, as indicated by arrow A, the crop of the bird is allowed to move in the transverse direction but is limited in moving in the upright direction. Further, the strap 522 located on the lower side of the crop 262, acts like an underwire of a bra by supporting the crop, especially a pendulous crop. This support is sufficient to hold the crop up sufficiently far to prevent any food therein from remaining and allowing the food to pass into the stomach of the bird 260. Such a configuration does not inhibit proper functioning of the crop but provides enough support to create this desirable effect but without requiring an additional cross-strap to be added to the device 500.

In another embodiment, a panel of colored lycra with two-way stretching (as opposed to long-stretch) could be added as an outer layer for a "fashion" effect without affecting the ability of the protection device 500 to support the crop 262.

It is noted that the stretching direction of the long-stretch material can be perpendicular to the straps 520, 522, as indicated by arrow T, if desired. However, in the configuration shown in FIG. 5, the stretch would not provide as sufficient a support to a pendulating crop as with the long-stretch being in upright orientation (arrow A).

Although the material shown in FIGS. 2 and 5 has a rectangular shape, other shapes, e.g., circular or ovular, are also within the scope of the present invention as long as the shape of the body portion 202 is configured to cover and protect the bird's crop. It is also within the scope of the present invention for the body portion 202 to include two layers of material (the main body and either an outer panel or an inner liner), or more than three layers of material.

In another exemplary embodiment, any one of the protection and support devices 100, 200, 400, 500 discussed above can be used in combination with the protective bird apron disclosed in U.S. Pat. No. 7,882,808 or 8,413,614, which are hereby incorporated herein by reference in their entirety, as a chest protector to protect the chest of the bird from pecking and plucking. When used in combination with the protective bird apron, the device 100, 200, 400, 500 can be attached to the protective bird apron by various measures, for example, sewing, adhesives, snap fasteners, hook and loop fasteners, and other suitable attachments means known in the art.

Any of the devices 100, 200, 400, 500 disclosed above are reversible with respect to both the top and bottom and inside and outside. For example, the device 400 of FIG. 4 can be positioned on the bird such that the first couple parts 430 are near the bird's shoulders (i.e., the first couple parts 430 are considered to be at the top of the device 400). Alternatively, the device 400 can be positioned such that the second couple parts 432 cross over the bird behind the bird's neck (i.e., the second couple parts 432 are considered to be at the top of the device 400).

In the exemplary embodiments shown, the straps 120, 130; 220, 230; 420, 430; 520, 530 are shown attached to the interior side of the body 102, 202, 402, 502. Attachment to the exterior side (not illustrated) is equally envisioned.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A bird support and protection device, comprising:
   a body portion:
      shaped to cover a crop of a bird;
      being of a long-stretch material having a long-stretch direction; and
   having:
      a top edge and an opposing bottom edge separated by first and second opposing side edges;
      a first securing strap attached to the first side edge parallel to the long-stretch direction; and
      a second securing strap attached to the second side edge parallel to the long-stretch direction, the first and second securing straps being operable to be releasably secured at a back of the bird:
         to attach the device to the bird such that the body portion substantially covers and supports the crop; and
         to provide a non-constricting and adjustably secure fit.

2. The device according to claim 1, wherein the body portion includes a main body and at least one of an outer panel and an inner liner attached thereto.

3. The device according to claim 1, wherein the first and second securing straps are operable to be secured at the back of the bird to define a single point of attachment including one of a bow and a knot.

4. The device according to claim 1, wherein the first and second securing straps are operable to be secured at the back of the bird in two points of attachment including one of:
   two separate bows;
   two separate knots; and
   a bow and a knot.

5. The device according to claim 1, wherein each of the first and second securing straps includes a two-part couple assembly including:
   a first part on a first portion of each securing strap; and
   a second part on a second portion of each securing strap, the first and second parts being operable to couple the second portion of each strap to the first portion of the opposing strap to secure the first and second securing straps at the back of the bird in two points of attachment.

6. The device according to claim 5, wherein:
   the first part of each securing strap includes a body member defining an aperture operable to receive therethrough the second part of the opposing strap;
   each second part includes a first sub-part and a second sub-part; and
   each first sub-part is operable to attach to the respective second sub-part of the same strap after being received through the aperture of the first part of the opposing strap to releasably couple the second portion of each strap to the first portion of the opposing strap.

7. The device according to claim 6, wherein the second part includes one of:
   a hook and loop fastener;
   a snap fastener; and
   a button and hole fastener.

8. The device according to claim 1, wherein the securing straps are comprised of at least one of elastic, lycra, cotton, denim, canvas duck, leather, nylon, fleece, Kevlar, and rubber.

9. The device according to claim 1, wherein the body portion is comprised of at least one of elastic, lycra, cotton, denim, canvas duck, leather, nylon, fleece, Kevlar, and rubber.

10. The device according to claim 1, wherein:
    the body portion includes a main body, an outer panel, and an inner liner; and
    each of the securing straps, the main body, and the outer panel are comprised of elastic and the inner liner is comprised of one of fleece and cotton.

11. The device according to claim 1, wherein the first and second securing straps are attached to the body portion by at least one of sewing, an adhesive, a snap fastener, and a hook and loop fastener.

12. The device according to claim 2, wherein the main body is attached to the at least one of the outer panel and the inner liner by at least one of sewing, an adhesive, a snap fastener, and a hook and loop fastener.

13. The device according to claim 1, wherein:
the first and second side edges each defining a body portion length;
each of the first and second securing straps:
extend longitudinally along an entirety of the body portion length; and
have a strap length greater than the body portion length such that each securing strap extends beyond at least one of the top and bottom edges.

14. The device according to claim 1, wherein the body portion is shaped as a bra to cover and support the crop of the bird by applying pressure against the crop with stretching of the long-stretch material when worn by the bird.

15. The device according to claim 1, wherein:
the first securing strap is integral with the first side edge; and
the second securing strap is integral with the second side edge.

16. The device according to claim 1, wherein the body portion is shaped to apply pressure to lift the crop.

* * * * *